(12) United States Patent
Ramos Peres et al.

(10) Patent No.: US 8,279,873 B2
(45) Date of Patent: Oct. 2, 2012

(54) OUT OF SEQUENCE DELIVERY OF STATUS REPORTS ON A SEPARATE CHANNEL

(75) Inventors: Edgar Ramos Peres, Espoo (FI); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 12/602,208

(22) PCT Filed: Jun. 1, 2007

(86) PCT No.: PCT/SE2007/050394
§ 371 (c)(1),
(2), (4) Date: Nov. 30, 2009

(87) PCT Pub. No.: WO2008/147271
PCT Pub. Date: Dec. 4, 2008

(65) Prior Publication Data
US 2010/0208651 A1    Aug. 19, 2010

(51) Int. Cl.
*H04L 12/56* (2006.01)
(52) U.S. Cl. ........................ 370/394; 370/469
(58) Field of Classification Search .......... 370/229, 370/230, 235, 351, 389, 394, 412, 464, 465, 370/469, 474, 476
See application file for complete search history.

(56) References Cited

U.S. PATENT DOCUMENTS

| | | | | |
|---|---|---|---|---|
| 2003/0092458 | A1* | 5/2003 | Kuo | 455/517 |
| 2004/0114593 | A1* | 6/2004 | Dick et al. | 370/389 |
| 2007/0275728 | A1* | 11/2007 | Lohr et al. | 455/450 |
| 2008/0267184 | A1* | 10/2008 | Arisoylu et al. | 370/391 |
| 2008/0298322 | A1* | 12/2008 | Chun et al. | 370/335 |

FOREIGN PATENT DOCUMENTS

| | | |
|---|---|---|
| EP | 1608194 A1 | 12/2005 |
| EP | 1641190 A1 | 3/2006 |
| EP | 1755355 A1 | 2/2007 |

OTHER PUBLICATIONS

3rd Generation Partnership Project. 3GPP TS 25.322, V6.7.0 (Mar. 2006), 3rd Generation Partnership Project; Technical Specification Group Radio Access Network; Radio Link Control (RLC) protocol specification (Release 6).

* cited by examiner

*Primary Examiner* — Kwang B Yao
*Assistant Examiner* — Obaidul Huq
(74) *Attorney, Agent, or Firm* — Coats & Bennett, P.L.L.C.

(57) ABSTRACT

In a method and a system Radio Link Control (RLC) Status Reports in a cellular radio system employing Acknowledge Mode (AM) RLC are not delivered in sequence, thereby obtaining an increased peak throughput. Thus, even when an in-sequence delivery exists, for example if the system uses HARQ transmission, it is not used for data related to the RLC status report.

11 Claims, 2 Drawing Sheets

OUT OF SEQUENCE DELIVERY OF STATUS REPORTS ON A SEPARATE CHANNEL

TECHNICAL FIELD

The present invention relates to a method and a system for transmitting Radio Link Control (RLC) status reports in a cellular radio system using Acknowledge Mode (AM) RLC. In particular the present invention relates to a method and a system for transmitting Radio Link Control (RLC) status reports in a cellular radio system using Acknowledge Mode (AM) RLC in combination with a transmission protocol requiring a re-ordering function.

BACKGROUND

The Radio Link Control (RLC) protocol has been standardized in the 3GPP specification TS. 25.322. There have been established three types of RLC entities with a different working methodology. The three types are: Transparent Mode (TM), Unacknowledged Mode (UM), and Acknowledged Mode (AM) RLC entities. The two first entities do not handle retransmissions in contrast with the third, the Acknowledged Mode (AM) RLC, which deploys a window based system to retransmit lost packets.

The AM RLC is window based and transmissions from a sender to a receiver are executed for as long as a sliding window is not depleted. The sliding window has a fixed size and it indicates the quantity of Protocol Data Units PDUs that are possible for a sender to keep and still continue sending data to the receiver without receiving an acknowledge.

When the quantity of PDUs that are possible for the sender to keep has been reached, the sender has to stop the sending of new PDUs until acknowledgements for previous PDUs are received. In AM RLC the acknowledgements are sent by the receiver to the sender in the form of status reports. The status reports can be viewed as a list of acknowledgments that are transmitted from the receiver to the sender in response to some predefined and configured trigger events. If the sender receives a status report, any and all negatively acknowledged PDUs have to be retransmitted. The triggers for sending a status report are listed in 3GPP TS 25.322 Radio Link Control (RLC) protocol specification and include PDUs with the poll bit set, which indicates to the receiver that the status report has to be delivered to the sender. Also the detection of missing PDUs and a periodical timer are triggers for status reports.

The status reports are sent after they have been triggered if the status prohibit timer is not running. The status prohibit timer is a configurable timer that prevents the receiver to send status reports during a specific amount of time. The purpose of the status prohibit timer is to avoid too frequent status reporting. If there are several status reports within a RLC round trip time (RTT), this may lead to unnecessary retransmissions, and poor protocol performance.

The status prohibit timer is set after one status report is sent and the receiver can not send a new status report until the timer expires. If during this time a status report is triggered, for example by any of the previously mentioned functions, it is postponed until the status prohibit timer has expired. The status reports are not retransmitted. Also the status reports do not have a sequence number and the sliding window is updated with the last received report.

The High Speed Downlink Shared Channel (HS-DSCH) is a high speed packet data channel defined in 3GPP Rel-5. The Enhanced Dedicated Channel (E-DCH) is the uplink counterpart specified in 3GPP Rel-6. Both HS-DSCH and E-DCH employ Hybrid Automatic Repeat Request (HARQ) with soft combining. The introduction of retransmission in HARQ level brought a need for reordering queues in the NodeB. The standard 3GPP TS 25.321 Medium Access Control (MAC) protocol specification specifies in-sequence delivery to the upper layers, and since a packet transmitted using HARQ can be received after several attempts of transmission causing an out-of-sequence delivery, so called reordering queues are implemented.

In existing solutions the peak performance of HS-DSCH in the downlink and E-DCH in the uplink is to a large degree limited by the RLC sliding window stalling when RLC AM is used. The RLC window stalls when the status reports have not been able to slide the window because they are delayed by HARQ retransmissions, or not received at all, for example due to HARQ failure.

Hence, there exist a need for a method and a system that is able to increase the performance in a system using RLC AM.

SUMMARY

It is an object of the present invention to increase the performance of a system using RLC AM.

It is another object of the present invention to provide a method and a system that is capable of improving the peak performance of a system using RLC AM in combination with a transmission protocol requiring re-ordering of packets, such as HARQ transmission.

It is yet another object of the present invention to provide a method and a system which prevents the sliding window of RLC AM from stalling.

These objects and others are obtained by the method and system as set out in the appended claims. Thus, by providing a method and a system where the RLC Status Reports do not need to be delivered in sequence an increased peak throughput is obtained. Thus, even when an in-sequence delivery exists, for example because HARQ transmission is used, in sequence is not used for data related to the RLC status report.

In accordance with one embodiment the RLC Status Reports is recognized and separated from other data transmitted from a sender to a receiver by assigning them to a separate logical channel which is different from channel(s) used for other transmitted data from the sender to the receiver.

In accordance with one embodiment the separate channel is a channel used for transmitting other RLC messages.

In accordance with another embodiment only the packets containing RLC Status Reports newer than the last transmitted are send to the upper layer, the rest are dropped. In the case when the status reports are transmitted on the same channel as the other RLC messages all the RLC control messages will suffer the same behavior as the RLC status reports. This is however not a problem. Thus the RLC status report together with the RLC messages will be delivered directly in the same way as for the DCH channel which does not have HARQ retransmissions.

BRIEF DESCRIPTION OF THE DRAWINGS

The present invention will now be described in more detail by way of non-limiting examples and with reference to the accompanying drawings, in which.

DETAILED DESCRIPTION

In existing systems for transmitting status reports when RLC AM is used, frequent status reporting has proved to provide peak performance, as is show in TCP Peak Performance of HSDPA with EUL. Edgar Ramos. LMF-06:000062. Rev. A. 2005-09-01

However, the status reports can still be delayed depending of the Block Error Rate targeted in the channels. For example, assume a high-speed download in a scenario where HSDPA and E-DCH with a 10 ms Transmission Time Interval TTI is used together with a HSDPA RLC Status Prohibit Timer using a low value for example <30 milliseconds. Normally, the downlink RLC Status Reports are in the same reordering queue as other data such as TCP acknowledgements in the uplink. Since they are in the same MAC PDU with other data, they can be placed in big transport blocks with a higher probability of reception failure in the NodeB. In addition, the downlink RLC Status Reports are affected by the uplink HARQ reordering queue because they have to wait until earlier MAC PDUs have been correctly received and delivered, causing delays in the downlink RLC window sliding. Due to the HARQ reordering in the uplink, several RLC Status Reports can be simultaneously in the uplink reordering queue. However, for Status Reports, in-sequence delivery is not required. It is thus only important to act on the latest correctly received Status Report.

Hence, by providing a method and a system where the RLC Status Reports do not need to be delivered in sequence an increased peak throughput is obtained. Thus, even when an in-sequence delivery exists for HARQ transmission, it is not used for data related to the RLC status report thereby improving the performance of the system.

Figure 1:
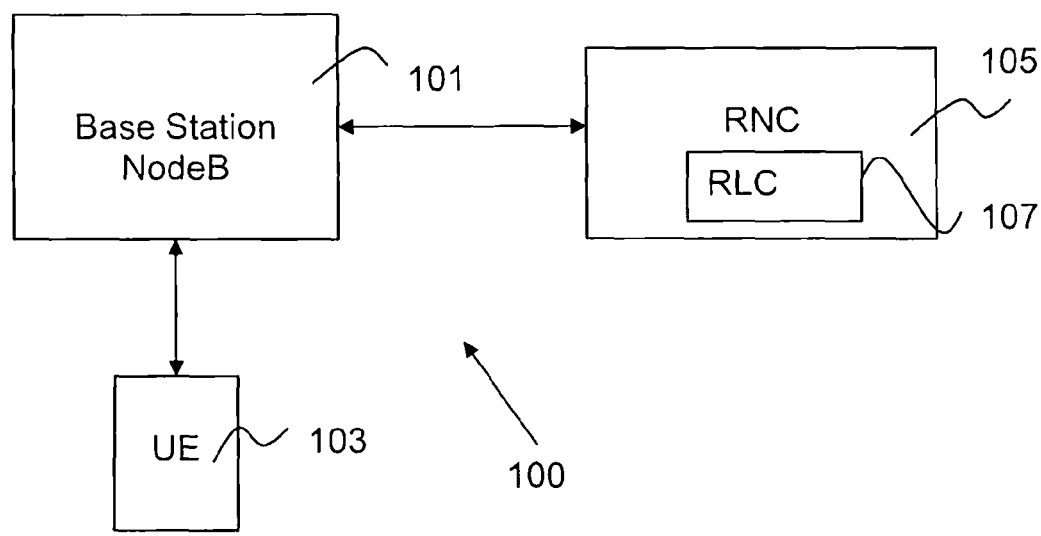
FIG. 1 is a general view illustrating a cellular radio system.

In FIG. 1 a general view illustrating a cellular radio system 100 is shown. The cellular radio system comprises a number of mobile stations or User Equipments generally denoted UE 103. Only one UE 103 is shown in FIG. 1 but of course any number of mobile stations can be present in a geographical area. The UE 103 can connect to the cellular radio system 100 via a base station, NodeB, 101 serving the area where the UE 103 is present. A number of base stations 101 are connected to a Radio Network Controller RNC 105. The RNC 105 typically also includes a Radio link controller node (RLC) 107. The RLC 107 is among other things responsible for detecting errors.

Figure 2:
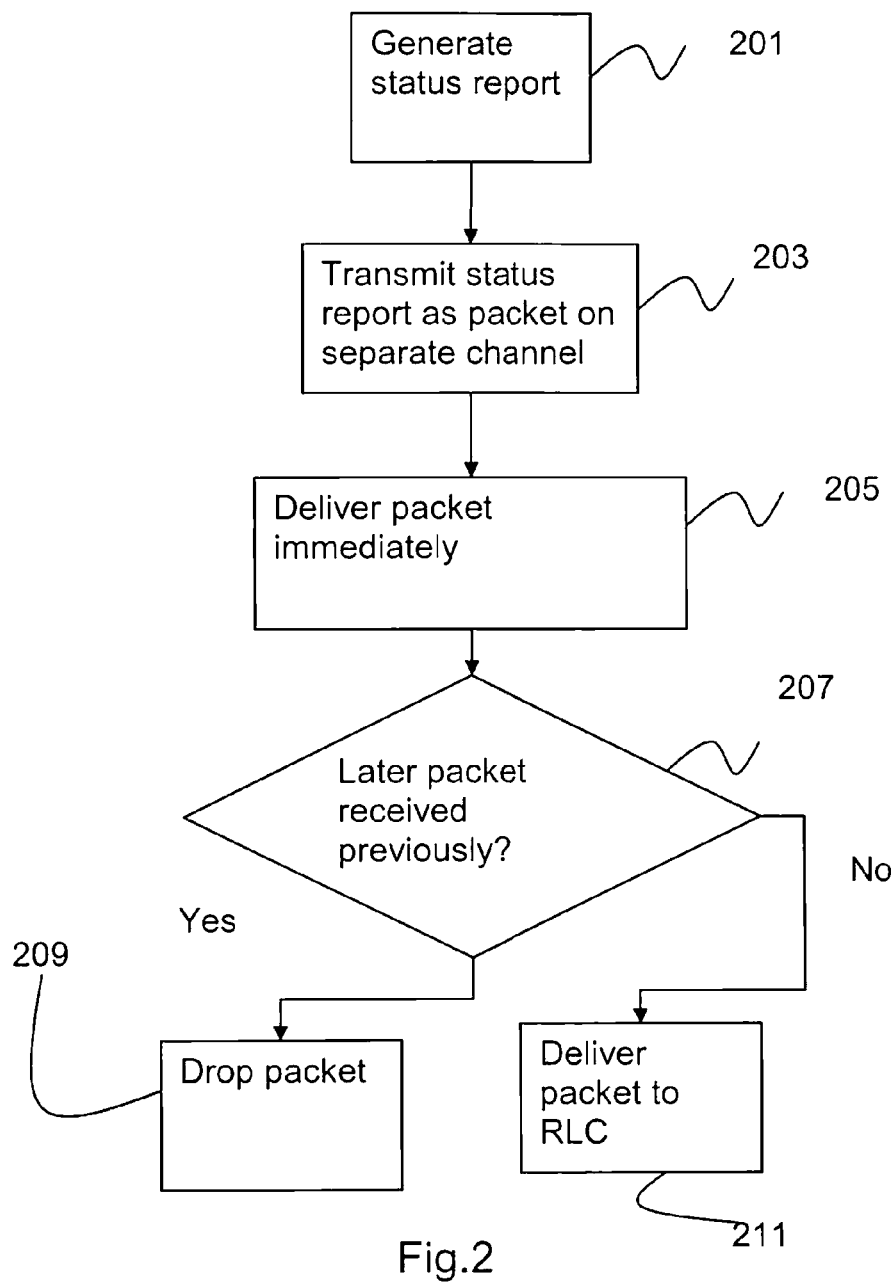
FIG. 2 is a flow chart illustrating different steps when transmitting data, in particular data related to RLC Status Reports.

In FIG. 2 a flow chart illustrating different steps when transmitting data, in particular data related to RLC Status Reports, in the uplink from the UE 101 to the RNC 105 is shown. First in a step 201 an RLC status report is generated. Next, in a step 203, the status report is transmitted in a PDU packet to the RNC on a separate logical channel used for the control RLC messages. The separate logical channel can be any type of channel or a separate MAC flow. Next, in a step 205, all PDU packets received on the separate logical channel are delivered immediately, i.e. without waiting to be reordered, Thereupon in a step 207, the receiver checks the Transmission Sequence Number TSN of the latest received packet on the separate logical channel. The check in step 207 is made against the TSN of the PDU packet having the highest TSN received so far, and taking into account wrap around effects. If in step 207, it is determined that the PDU packet now received is generated earlier than any previously received PDU packet, such a packet is dropped in a step 209. Else the PDU packet comprising the RLC AM status report is delivered to the RLC in a step 211. HARQ retransmissions should still be employed for the RLC status reports.

The method as described in conjunction with FIG. 2 can equally well be employed in the downlink when the RLC status reports are transmitted from the RNC to a UE.

Using the method and apparatus as described herein where HARQ reordering is not performed on RLC control messages, and in particular RLC status reports, the AM RLC protocol will be given a better performance by promoting a faster sliding of the transmission window. This is obtained by realizing that the latest RLC status report is always the one to act upon. Hence it is not necessary to deliver old reports to RLC.

The invention claimed is:

1. A method of receiving Radio Link Control (RLC) Status Reports in a cellular radio system used for transmission of data between a sender and a receiver, said method comprising:
   receiving data on at least one first logical channel;
   receiving RLC status reports on a second logical channel separate from said at least one first logical channel, wherein the RLC status reports are sent in Protocol Data Unit (PDU) packets;
   determining whether a given RLC status report is the latest one based on checking a Transmission Sequence Number (TSN) of the PDU packet in which the given RLC status report is received; and
   delivering the given RLC status report to an RLC protocol processor directly upon reception of such a status report without buffering it in a reordering queue, based on the given RLC status report being the latest RLC status report for the given cellular radio link, and otherwise dropping the given received RLC status report rather than delivering it to the RLC protocol processor.

2. The method of claim 1, wherein other data received on said at least one first logical channel are reordered by the receiver before being delivered.

3. The method of claim 1, wherein a Hybrid Automatic Repeat Request (HARQ) transmission protocol is employed.

4. The method of claim 1, further comprising receiving RLC status reports on a separate second logical channel and transmitting RLC control messages on the same separate second logical channel.

5. A receiver for receiving Radio Link Control (RLC) Status Reports in a cellular radio system and for receiving data in said cellular radio system, said receiver comprising:
   a communication interface configured for receiving RLC status reports on a separate logical channel, separate from channels used to receive data; and
   one or more processing circuits configured for delivering RLC status reports directly upon reception of such a status report without buffering them in a reordering queue, based on delivering a given received RLC status report to the RLC protocol processor if it is the latest RLC status report for the given cellular radio link, and otherwise dropping the given received RLC status report rather than delivering it to the RLC protocol processor;
   wherein the RLC status reports are sent in Protocol Data Unit (PDU) packets on a logical channel separate from one or more data channels used to send data, and wherein the one or more processing circuits are configured to determine whether a given RLC status report is the latest one by checking a Transmission Sequence Number (TSN) of the PDU packet in which the given RLC status report is received.

6. The receiver of claim 5, wherein the one or more processing circuits are configured for reordering the data received on the separate channels used to receive data, before the data is delivered.

7. The receiver of claim 5, wherein the receiver is configured for receiving the data and the RLC status reports using a Hybrid Automatic Repeat Request (HARQ) transmission protocol.

8. The receiver of claim 5, wherein the receiver is configured for receiving RLC control messages on the same separate logical channel as it receives the RLC status reports.

9. A node configured for operation in a cellular radio system comprising:
- a communication interface configured for receiving Radio Link Control (RLC) status reports for a given cellular radio link; and
- one or more processing circuits configured for delivering received RLC status reports to an RLC protocol processor without reordering them, based on delivering a given received RLC status report to the RLC protocol processor if it is the latest RLC status report for the given cellular radio link, and otherwise dropping the given received RLC status report rather than delivering it to the RLC protocol processor;

wherein the RLC status reports are sent in Protocol Data Unit (PDU) packets on a logical channel separate from one or more data channels used to send data, and wherein the one or more processing circuits are configured to determine whether a given RLC status report is the latest one by checking a Transmission Sequence Number (TSN) of the PDU packet in which the given RLC status report is received.

10. The node of claim 9, wherein the node comprises a Radio Network Controller (RNC).

11. The node of claim 9, wherein the node comprises a User Equipment (UE).

* * * * *